US008412984B2

(12) United States Patent
Maybee et al.

(10) Patent No.: US 8,412,984 B2
(45) Date of Patent: Apr. 2, 2013

(54) DEBUGGING IN A CLUSTER PROCESSING NETWORK

(75) Inventors: Paul Maybee, Seattle, WA (US); Daniel Moth, Seattle, WA (US); Anitha Panapakkam, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 217 days.

(21) Appl. No.: 12/944,740

(22) Filed: Nov. 12, 2010

(65) Prior Publication Data
US 2012/0124426 A1 May 17, 2012

(51) Int. Cl.
*G06F 11/00* (2006.01)

(52) U.S. Cl. ............... 714/38.1; 714/25; 714/10; 714/2

(58) Field of Classification Search ............. 714/25, 714/38.1
See application file for complete search history.

(56) References Cited

U.S. PATENT DOCUMENTS

| | | | |
|---|---|---|---|
| 5,526,485 A | 6/1996 | Brodsky | |
| 6,601,188 B1 | 7/2003 | Wilding | |
| 2004/0199815 A1* | 10/2004 | Dinker et al. | 714/21 |
| 2006/0101405 A1* | 5/2006 | Buschardt et al. | 717/124 |
| 2006/0265375 A1* | 11/2006 | Hess | 707/9 |
| 2007/0094532 A1 | 4/2007 | Sengupta et al. | |
| 2007/0168994 A1* | 7/2007 | Barsness et al. | 717/129 |
| 2009/0089622 A1 | 4/2009 | Qi et al. | |
| 2009/0160731 A1* | 6/2009 | Schuler et al. | 345/1.1 |
| 2009/0178028 A1* | 7/2009 | Best et al. | 717/124 |
| 2009/0199163 A1* | 8/2009 | Soroker et al. | 717/128 |
| 2010/0023799 A1* | 1/2010 | Garbow | 714/2 |
| 2010/0107012 A1* | 4/2010 | Gooding | 714/37 |
| 2010/0192005 A1* | 7/2010 | Das et al. | 714/2 |
| 2010/0333092 A1* | 12/2010 | Stefansson et al. | 718/100 |
| 2011/0078666 A1* | 3/2011 | Altekar | 717/131 |

OTHER PUBLICATIONS

"Debugging Overview", Retrieved at << http://etutorials.org/Programming/programming+microsoft+visual+c+sharp+2005/Part+IV+Debugging/Chapter+12+Debugging+with+Visual+Studio+2005/Debugging+Overview/ >>, Retrieved Date : Aug. 6, 2010, pp. 10.
"NTSD as a better Dr.Watson", Retrieved at << http://www.debuginfo.com/articles/ntsdwatson.html >>, Jun. 21, 2005, pp. 3.
Richter,J. "Just-In-Time Debugging", Retrieved at << http://flylib.com/books.php?ln=en&n=4&p=419&c=168&p1=1&c1=1&c2=193&view=2 >>, Aug. 6, 2010, pp. 3.
"Debugging in Visual Studio", Retrieved at << http://msdn.microsoft.com/en-us/library/sc65sadd.aspx >>,Retrieved date: Aug. 6, 2010, p. 1.
"How to Configure and Launch the MPI Cluster Debugger", Retrieved at << http://msdn.microsoft.com/en-us/library/dd560809.aspx >>, Aug. 6, 2010, pp. 3.

* cited by examiner

*Primary Examiner* — Scott Baderman
*Assistant Examiner* — Sarai Butler
(74) *Attorney, Agent, or Firm* — Zete, Law, P.L.L.C.; MacLane C. Key

(57) ABSTRACT

A technology is described for debugging in a cluster processing network. A scheduler can dispatch a process that is part of the cluster job for execution. Further, a compute node can be used to execute the process dispatched by the scheduler to the compute node. A debugger can be activated in response to an unhandled suspension event in the process on the compute node. In addition, the debugger can send notification messages regarding the unhandled suspension event. A job monitor can receive a notification from the debugger that an unhandled suspension event has occurred. The notification can be displayed to a user via the job monitor.

20 Claims, 5 Drawing Sheets

DEBUGGING IN A CLUSTER PROCESSING NETWORK

BACKGROUND

Cluster computing typically uses a group of linked computers that can work together to form a single cluster computer. The computing components of a cluster computer are commonly connected to each other using computer networks such as a fast local bus, fast local area networks, a blade network, or even across the internet. Clusters are usually deployed to improve performance and availability over a single computer alone, while typically being more cost-effective than a single computer of comparable speed or availability.

A cluster computer can receive jobs from a user, and these jobs may be divided up into a number of tasks and processes for the tasks that are assigned across a plurality of compute nodes. The compute nodes may be a single computer, server, or a processor that can accept many processes from a job. Alternatively, each computer or server may execute one process from the job. However, when a job on cluster processing system crashes or terminates unexpectedly then the user may receive information that an overall job has failed but the user will not receive any other information about why the job failed.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various examples are described for debugging in a cluster processing network. An example system can include a scheduler to dispatch a process that is part of the cluster job for execution. Further, a compute node can be used to execute the process dispatched by the scheduler to the compute node. A debugger can be activated in response to an unhandled suspension event for the process on the compute node. In addition, the debugger can send a notification message regarding the unhandled suspension event. A job monitor can receive the notification message from the debugger that an unhandled suspension event has occurred. The notification can be displayed to a user via the job monitor.

An example method can be provided for debugging of a process in a cluster job in a cluster processing network. The method can include dispatching a process to execute on a compute node using a scheduler. The process that is part of the cluster job can execute on the compute node. A further operation is activating a debugger on the compute node in response to an unhandled suspension event for the process. A notification can be sent from the debugger to a job monitor associated with the head node that an unhandled suspension event has occurred.

DETAILED DESCRIPTION

Figure 1A:
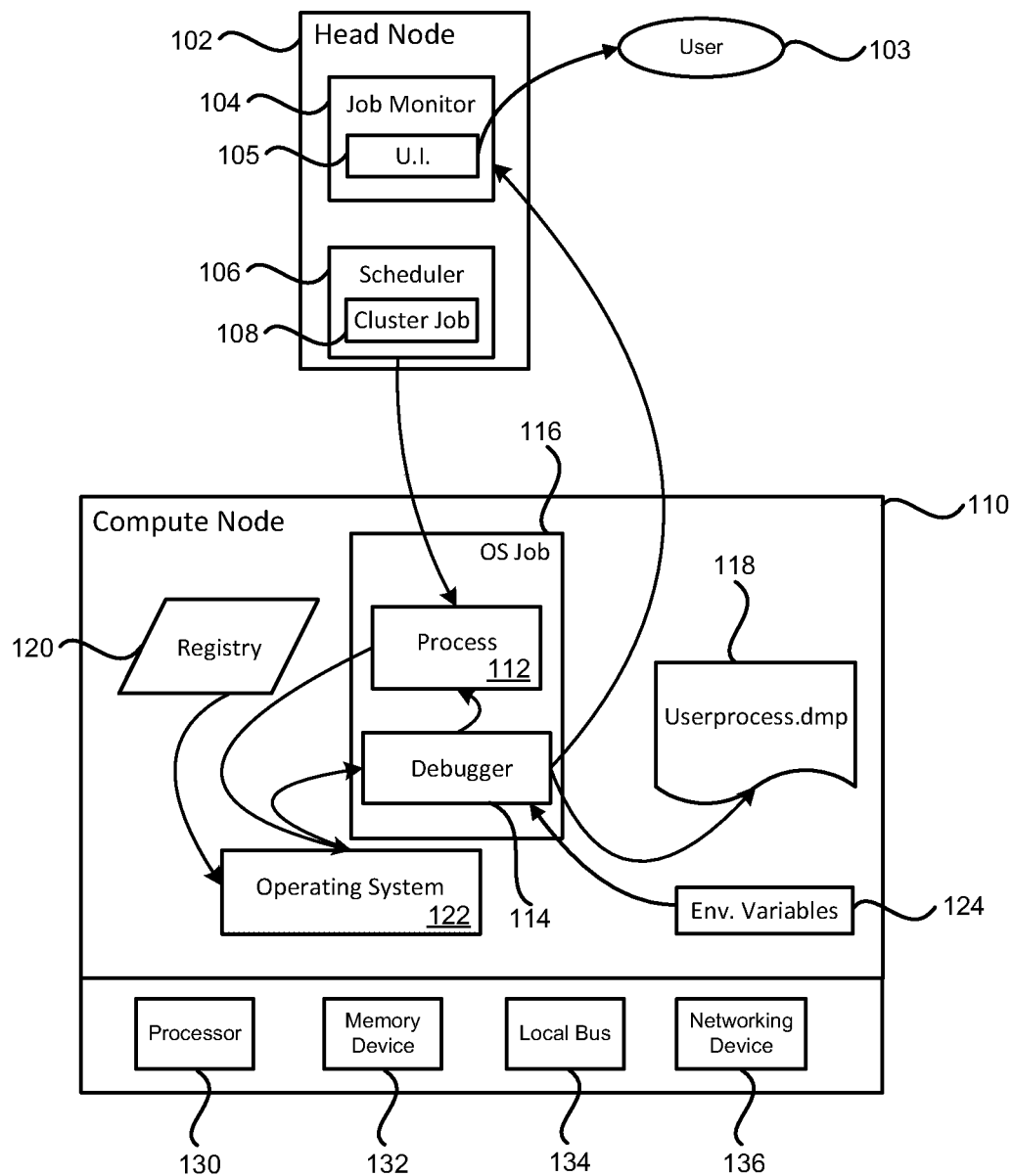
FIG. 1A is a block diagram illustrating an example of system for debugging in a cluster processing network.

Reference will now be made to the exemplary embodiments illustrated in the drawings, and specific language will be used herein to describe the same. It will nevertheless be understood that no limitation of the scope of the technology is thereby intended. Alterations and further modifications of the features illustrated herein, and additional applications of the embodiments as illustrated herein, which would occur to one skilled in the relevant art and having possession of this disclosure, are to be considered within the scope of the description.

This technology provides debugging capabilities for processes on computer clusters that are executing cluster jobs. For example, just-in-time (JIT) debugging can be provided for debuggers on compute nodes in a processing cluster, where a process has crashed, terminated, or reached a user-set debug point. The technology can notify the user that a crash has occurred on a compute node. In addition, mechanisms can be provided to allow the user to analyze the failure. If desired, the process' memory state can be dumped or written to a file for off-line analysis or post mortem exploration. The process on the compute node or remote node can also be held in the crashed state so that a symbolic debugger can be attached to the process to analyze a current process state. Debugging of processes on the cluster of compute nodes may also take place.

FIG. 1A illustrates a system for debugging on a cluster processing network. The system may include a head node 102 to manage a cluster job 108 (or job) processed on the cluster processing network. A scheduler 106 can be used to dispatch a process that is part of the cluster job for execution.

A compute node 110 can execute the process dispatched by the scheduler to the compute node. A compute node may be a server, a workstation or another computing node that is separate from the head node. The compute node can include a hardware processor device 130, a hardware memory device 132, a local communication bus 134 to enable communication between devices and components, and a networking device 136. While only one compute node is illustrated for simplicity sake, a cluster processing network typically contains a plurality of compute nodes that report back to a head node 102.

A debugger 114 on the compute node 110 can be activated in response to an unhandled suspension event in the process executing on the compute node. An unhandled suspension event can include unhandled exception events, runtime fatal errors, explicitly raised exceptions, and debugging break type of events. An unhandled exception event is an error event that does not have an applicable exception handler to cover the error in the process or programming framework (e.g. .Net framework), and the unhandled error can be caught by the system default handler.

The debugger 114 may be a just-in-time (JIT) debugger that is configured to accept a handle from the process when the process has crashed, and the debugger type that is started can be defined by the operating system datastore 120. An example of a datastore can be a registry in the Microsoft Windows operating system. In addition, a symbolic debugger can attach to the process and initiate the debugging of the program by displaying source code, variable states, program states, object code and/or other related process debugging information. However, until instructions are received from an end user, the JIT debugger can open a handle to the process and wait for the process to be debugged by the symbolic debugger. A just-in-time debugger is a debugger that launches at the time an error or break point is detected rather than having the debugger running the entire time the process is being debugged. While the more general term "debugger" is used in this description because various types of debuggers may be activated upon an unhandled suspension event, the term JIT debugger will be used more frequently in this discussion to distinguish a debugger that handles the unhandled suspension event from the symbolic debuggers that a user can use for application debugging.

As discussed, the JIT debugger can be configured to send notifications or messages to the head node 102 regarding an unhandled suspension event. The following example types of errors or break calls may be debugged for both native and managed code:

Runtime fatal errors

Unhandled exceptions (in both native and managed code)

Environment::FailFast method or RaiseFailFastException function (in Microsoft Windows Operating Environment).

DebugBreak( ) function (Microsoft Windows)

Debugger::Launch

Debugger::Break

A job monitor 104 can receive the notifications or messages from the JIT debugger that an unhandled suspension event has occurred. The job monitor can be located in the head node or the job monitor can be executing on a separate computing device that is in communication with the head node. The message that the JIT debugger sends to the job monitor may provide notification that at least one process associated with the cluster job is waiting for debugging to begin. This message information allows the job owner or end user to take action and analyze the reasons that a process has terminated or reached a debug point.

Figure 1B:
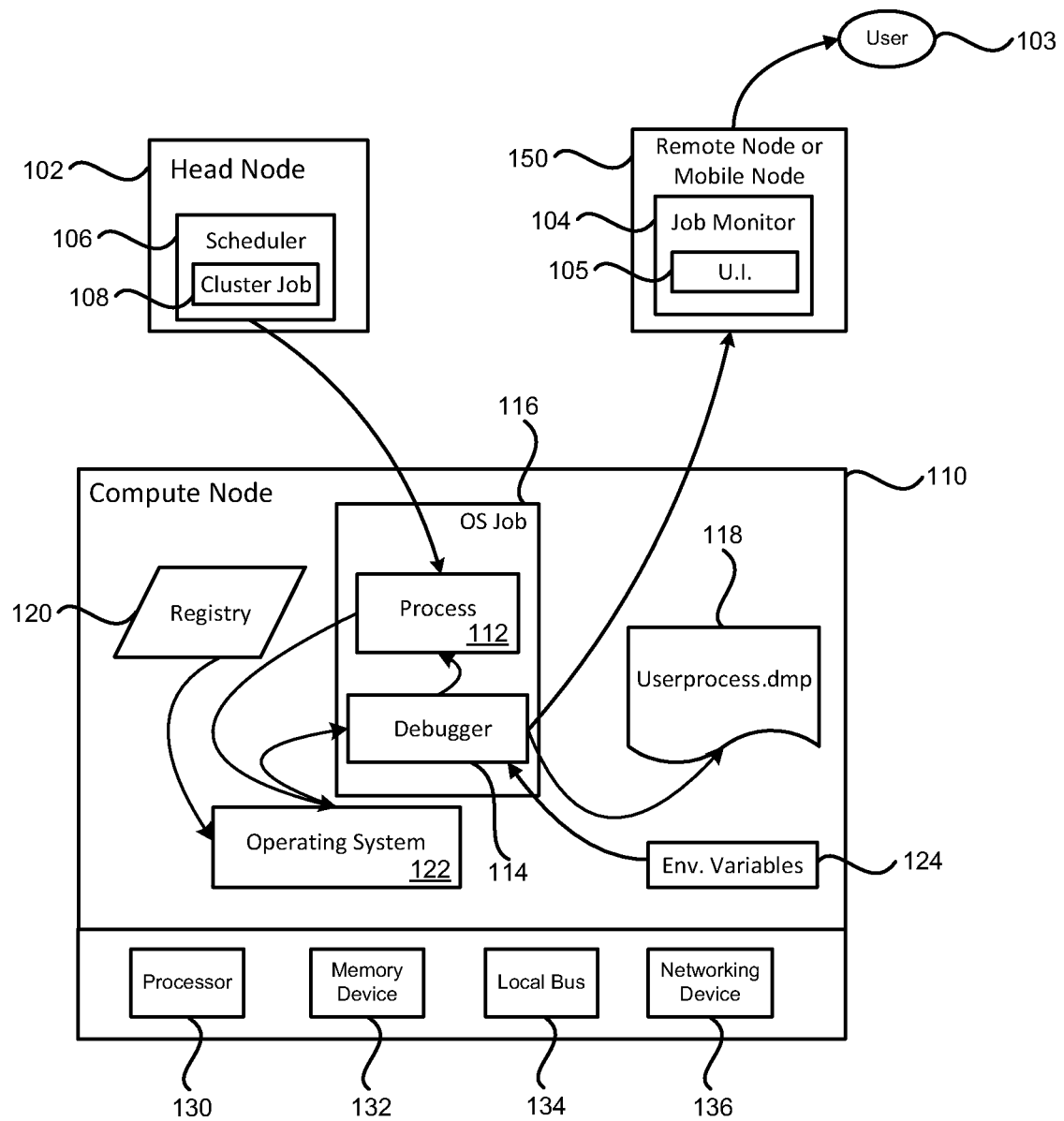
FIG. 1B is a block diagram illustrating an example of system for debugging in a cluster processing network using a remote node.

Alternatively, the job monitor can execute on a remote node 150 or computing device capable of executing the job monitor that is not part of the computing cluster but the end user 103 is able to access the remote node, as in FIG. 1B. In another example, the remote node may be a mobile device such as a cellular phone, wireless computing tablet, or another mobile device that is in networked communication with the JIT debuggers in the cluster. In addition, the user may have access to the job monitoring information on the remote node or the head node using a web application and a web server combination.

The job monitor is also able to watch the status of an entire job. If a process or even more than one process fails, then the user can be notified about the failure of the job. The reasons that the job failed can also be examined using the information provided to the user through the job monitor. The job managed can also be programmatically queried, for example, by the symbolic debugger or job monitor in order to present a list of the job's crashed processes. As a result, a list of the crashed processes can be displayed to a user through the symbolic debugger or the job monitor.

Returning to FIG. 1A, a user interface 105 can be provided with the job monitor 104 to display a notification that the process 112 from the cluster job on the compute node is waiting for an attachment operation from a symbolic debugger. The symbolic debugger can control the process and read or display the processes memory. The symbolic debugger's user interface (UI) is not typically activated by the JIT debugger but the user can initiate that attachment as desired. The user interface may notify an end user 103 or a system administrator regarding the process that is waiting for a symbolic debugger using an interface control that is a list view, a pop-up window, a tabular format, colored highlighting, or another user interface control. For example, the job monitor can display a listing of processes for a job and have a state column that shows that a process (i.e., in a cluster job) is waiting for an attach operation by a symbolic debugger. The user interface can also display a notification about an activation of the JIT debugger on the compute node.

The job monitor can send a message, email, text or instant message (IM) or another electronic communication to a user that is a job owner. For example, an email can inform the job owner that a process (cluster job and task information included) is waiting for an attach operation from a symbolic debugger. An electronic message can also be sent to someone else that is administering the cluster job for the job owner. For example, a message or email can be sent to a third party that a process (cluster job and task information included) is waiting for an attach operation from a symbolic debugger.

Notifications can also take place using a system tray type of notification. For example, when the job monitor or job manager is minimized in an operating system user interface, then failed jobs can show up as notifications in system tray, a system popup window, or using another system notification user interface.

The JIT debugger can access environmental variables 124 in order to determine an action to take when the unhandled suspension event is received. These environmental variables can be stored with the operating system job 116. Alternatively, the environmental variables can be stored in the operating system 122, or in another location on the compute node 110. The JIT debugger may directly read the process environment block (PEB) of the process being debugged to identify the environmental variable pairs in a straight forward fashion. Reading the environmental variables from the process environment block (PEB) can avoid an extra function call to a service from the JIT debugger to determine a job's properties. As a result, the JIT debugger can take directives from the environment of processes in the cluster job. Because the JIT debugger may be part of the operating system job, the JIT debugger can also read a user context environment for the process which may include the job identifier with which cluster job is associated.

The environmental variables can determine the JIT debugger's actions when the unhandled suspension event is received via the operating system 122. For example, the environmental variables can define actions to be performed by the JIT debugger such as writing a debug file dump 118, waiting for an attach operation for a crashed process, or waiting for an attach operation for a process that has reached a debug break. The environmental variables can also store a pre-defined location for writing a crash dump that is defined by a directory path, URL (uniform resource locator) and/or file name. The environmental variables can also determine whether a JIT debugger times out waiting for a symbolic debugger attach operation after a pre-defined time limit. A JIT debugger timeout can be provided to avoid consuming resources on the compute device using the process for an extended period of time.

Table 1 illustrates an example of the environment variables that can be set when scheduling a job or a process:

TABLE 1

| Name | Default | Values |
| --- | --- | --- |
| DEBUG_DUMP | None(0) | Mini(1), Full(2) |
| DEBUG_DUMPLOCATION | TMP folder | |
| DEBUG_WAITONCRASH | Abort(0) | WAIT(1) |
| DEBUG_WAITONDEBUGBREAK | Abort(0) | WAIT(1) |
| DEBUG_TIMEOUT | 30 minutes | |
| ... | ... | ... |

Table 1 does not show all the possible environmental variables that may be set for a process with which just-in-time debugging is desired to be used, but Table 1 does show one possible example of environmental variables. For example, a debug timeout value may be set to 30 minutes but this amount of wait time is simply a default value that can be modified by a user. Other environmental variables may be used, such as settings defining what additional debugging message information about a process can be sent to the head node or provided to the end user.

Because of the environmental variables, the JIT debugger can be aware that a given process is part of a cluster job and the JIT debugger can respond appropriately. For example, the JIT debugger knows what actions to take related to debugging. The JIT debugger can also report back about a process failure because the JIT debugger can know which cluster job the process belongs to and can send that information to the job monitor. As a result, the end user can be notified of problems and take interactive steps to debug the processes on remote compute nodes, which in turn can debug the overall cluster job.

In some configurations of this technology, the user can set at least one of the environment variables to enable the JIT debugging for the cluster job or individual process. Whereas, if no environmental variables are set, then no JIT debugging may take place. One example variable from Table 1 that can be set is DEBUG_DUMP and if the variable is set to "Mini" or "Full", then an appropriate truncated or full dump will be written to a file on a storage device. If the DEBUG_WAITONCRASH variable is set to "Hold", then the process can wait for an attach operation from the symbolic debugger. As another example, if the DEBUG_WAITONDEBUGBREAK variable is set to "Hold", then the process can wait for an attach operation from the symbolic debugger when a user defined break point has been set and reached during execution.

The technology can also provide a way to mark that a cluster job or cluster task has a process waiting for an attach operation. Specifically, when the user has scheduled a job with the environmental variable DEBUG_WAITONCRASH set to "True" and the process that is part of the cluster job crashes or hits a breakpoint, then the system can show that status in the job manager. If a graphical tabular view is provided in the job manager, then a column can be provide that illustrates an icon or check box to represent that a job has at least one process is waiting for an attach operation. Then the user can drill-down into the job and look at the actual compute node and process that is waiting for an attach operation.

Alternatively, the attach notification information can be stored at the process level and processes for a cluster job that are waiting for attachment can be displayed. In addition, data regarding whether a crash dump has been taken for a process and the URL for file path name of the crash dump can be stored and displayed. For example, when a user schedules a cluster job, a text box entry control can be provided for the user to specify a dump location for crashed processes a compute node or a default file location can be used. If a user requested a crash dump to be taken and the job is interrupted, then information about the job state failure and process state failure can be displayed to a user along with a crash dump location listed in a results user interface or window for the crash dump.

Further, the notification that processes are waiting for an attach operation by the symbolic debugger can be displayed at both the cluster job level and the process display level. For example, the machine name and process ID of the crashed or displayed process can be included in the job level and process level display.

An example of certain details the JIT debugger may also collect about the crashed process will now be described. Specifically, the JIT debugger can determine whether the crashed or stopped process is part of a cluster job. If the process is part of the cluster job, then the JIT debugger can check to see whether an environmental variable such as DEBUG_DUMP or DEBUG_WAITONCRASH is set. If one of the environmental variables that the JIT debugger is looking for is defined, then information can be read by the JIT debugger from the JOBID, TASKID, and SCHEDULER information fields and this information can be sent as a part of the notification information. These above mentioned properties are environmental variables of the crashed process.

In many cases, the JIT debugger may automatically become part of the operating system job object when started. So, the JIT debugger can directly read and access this environment variable information. However, this default behavior may or may not be implemented in the operating system. Alternatively, the JIT debugger can read the PEB (process environmental block), then get the offset to the environment block and loop through reading the variables.

The JIT debugger may exit under some conditions such as:

Wrong command line options or error conditions

When the JIT debugger determines that the process is not part of a cluster job

Figure 2:
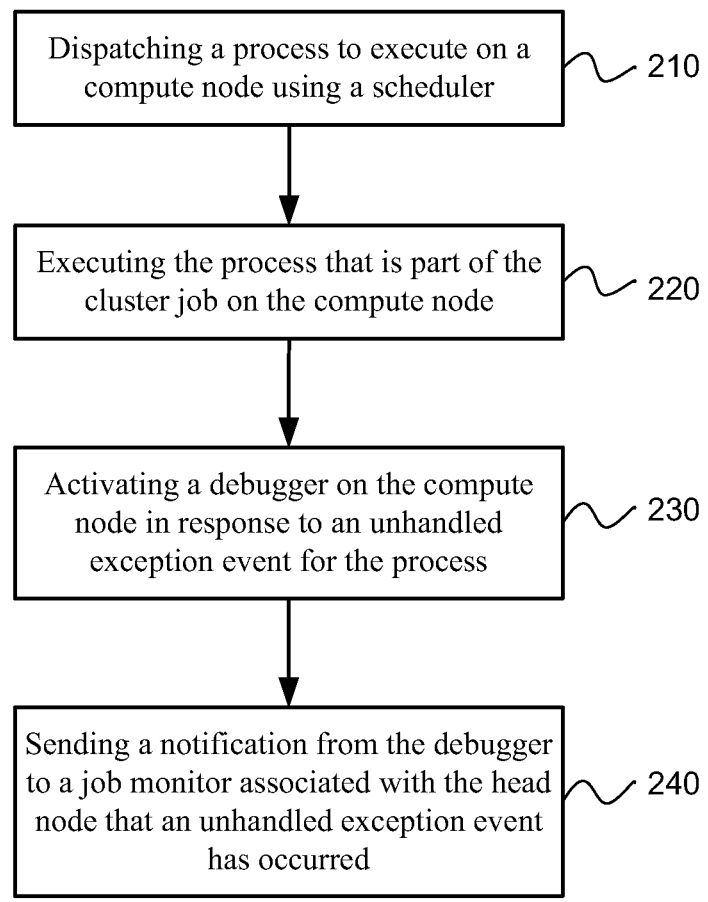
FIG. 2 is a flowchart illustrating an example method for debugging of a process in a cluster job in a cluster processing network.

When the JIT debugger determines that the process is part of a cluster job but the user has not set the environment variables When the user has set only DEBUG_DUMP option, then the JIT debugger can create the crash dump and exit In the case a user is requesting WAITFORATTACH, the JIT debugger can exit when: a) The process exits (someone kills it from a task manager), b) the job is cancelled and all the processes that are part of the job object exit, or c) the maximum timeout is reached A user terminates the JIT debugger FIG. 2 illustrates a high level example of a method for debugging of a process in a cluster job in a cluster processing network. The method includes the operation of dispatching a process to execute on a compute node using a scheduler, as in block 210. The process can be dispatched from the head node. The process can be one of a plurality of processes that are dispatched to a plurality of compute nodes to complete a cluster job.

The process that is part of the cluster job can execute on the compute node, as in block 220. When the process has completed, then the results from the process and other processes for the cluster job can be collected together. However, some processes may crash before completion or may have user set break points in the process. In addition, a debugger or JIT debugger can be activated on the compute node in response to an unhandled suspension event for the process, as in block 230. The process can be started on the compute node with just-in-time debugging configuration flags. When the unhandled suspension event is received, the just-in-time debugging flags can be checked to see of the debugging flags are set and the just-in-time debugger can be started when the debugging flags are set. The activated debugger or JIT debugger can access environmental variables in order to determine an action to take upon receiving an unhandled exception. One possible JIT debugger action is opening a handle to the process and waiting for the process to be debugged. Other actions can be taken as described above, including taking a crash dump, etc.

In a further operation, a notification can be sent from the debugger or JIT debugger to a job monitor associated with the head node that an unhandled suspension event has occurred, as in block 240. The notification can be a network message sent across a computer network informing the job monitor that a process of the cluster job is waiting for debugging to begin. The notification about a JIT debugger's activation can be displayed using a user interface in the job monitor.

Figure 3:
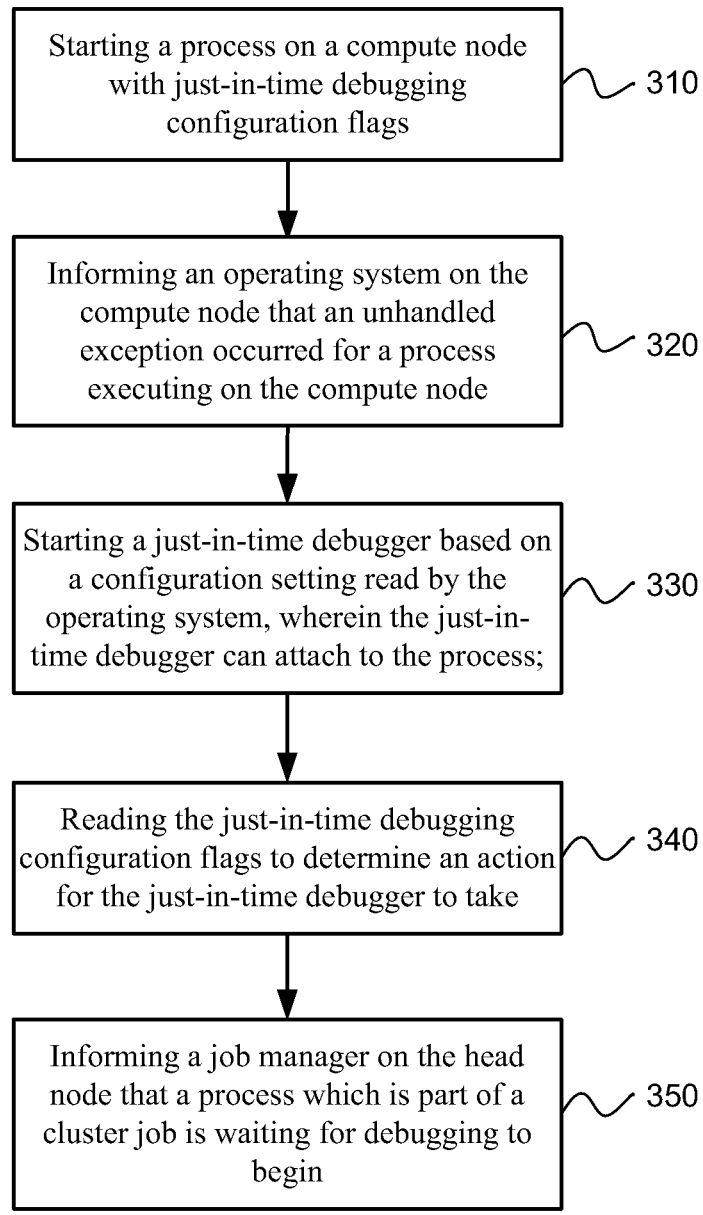
FIG. 3 is a flowchart illustrating an example of a method for just-in-time debugging in a cluster processing network.

FIG. 3 illustrates a more detailed example of a method for debugging in a cluster processing network having a head node and a compute node. The method for debugging can include the operation of starting a process on a compute node with just-in-time debugging configuration flags, as in block 310. The process can be sent to the compute node from a head node and scheduler or the process can be started by a user. The operating system on the compute node can then be informed when an unhandled exception occurred for a process executing on the compute node, as in block 320.

A just-in-time debugger can be started based on a configuration setting read by the operating system, as in block 330. The configuration settings that control which just-in-time debugger starts can stored in an operating system datastore. The just-in-time debugger can provide a handle for attaching a symbolic debugger to the process.

The just-in-time debugging configuration flags can be read by the just-in-time debugger to determine an action for the just-in-time debugger to take after the process crash or break point has occurred, as in block 340. As discussed previously, the configuration settings to control whether the JIT debugger starts and the behavior of the JIT debugger may be stored in environmental variables with the process or in another electronic storage location on the compute node. As an example of the configuration flags, a crash dump of the process can be taken based on debugging configuration flag settings. In addition, a handle to the process can be opened and the process can wait to be debugged based on the related debugging configuration flag.

A job manager on the head node can then be informed that a process which is part of a cluster job is waiting for debugging to begin, as in block 350. The job manager may then inform a user that a process is waiting for debugging to begin and the notification can be via an email, text message, or phone call. In addition, the notification can be presented using an operating system notification event on the head node. For example, a notification can be received in a system tray control. The notification may be that a cluster job has failed and the process on a specific compute node for the cluster job has crashed. In addition, the user can be notified that the process is waiting for debugging.

In one example configuration, the communication and sending of messages between the head node and the compute nodes can be facilitated by a service running on the head node and another service running on the compute nodes. A service on an operating system may be a persistent executable that performs designated functions in a background for the operating system. A service can be configured to start when the operating system is booted and run in the background as long as the operating system is running, or the service can be started when the process is started. The service on the head node may be used primarily for user notification purposes. Furthermore, the service on the compute nodes may take care of communication functions and aid in attach operations, where the process handle is held until a symbolic debugger is selected to attach to the process.

Figure 4:
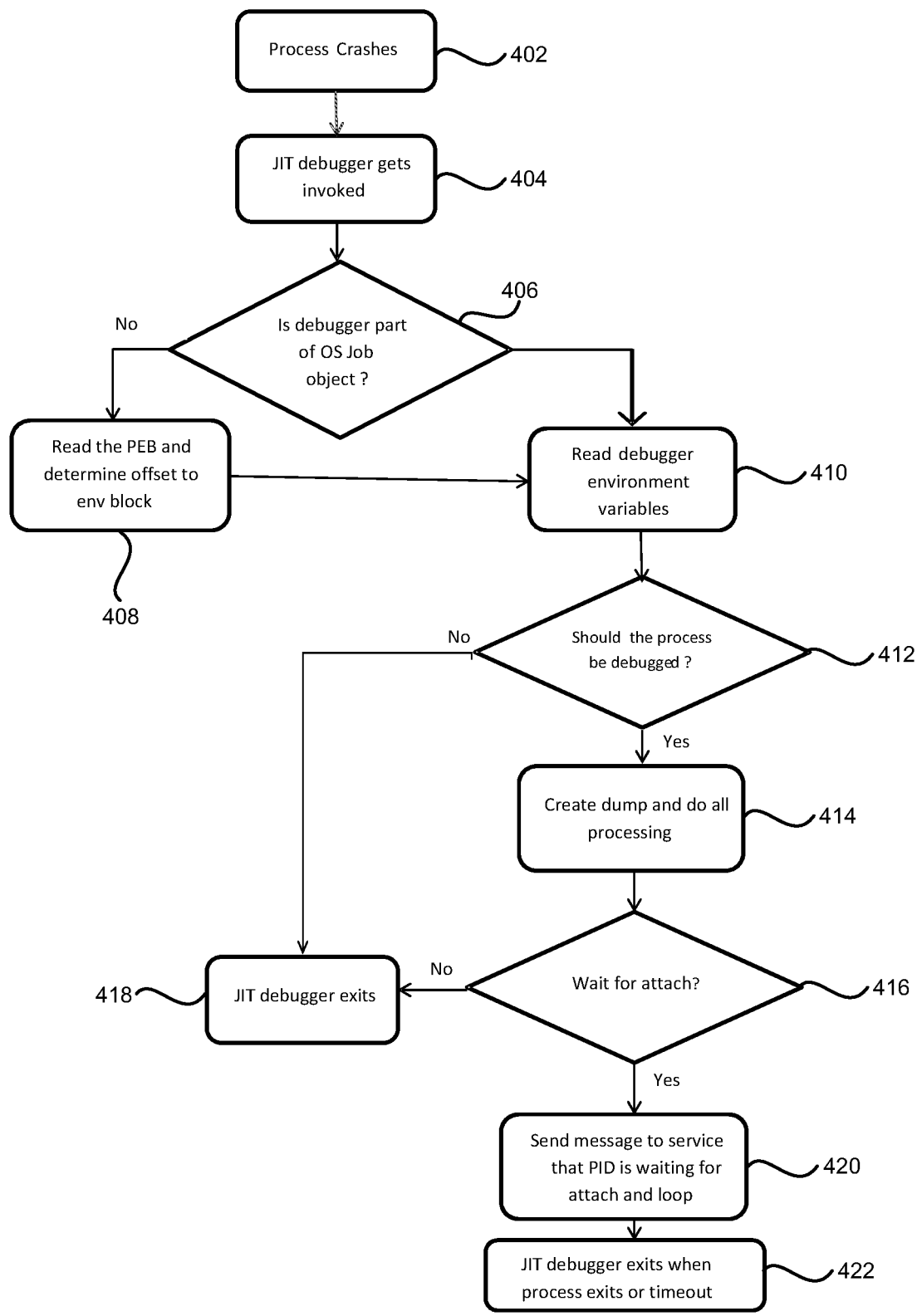
FIG. 4 is a flowchart illustrating an example of a more detailed method for just-in-time debugging in a cluster processing network.

For example, a service running on head node may do the following:

Update the job debug state change in a database when: a) the JIT debugger is waiting for an attach, or b) when the JIT debugger has exited Update the user viewable result information for the task associated with the process that crashed when: a) the debugger is waiting for an attach operation, b) the debugger has exited and provided crash dump location information, or c) the mail API is called to send email for the first process that crashed in a job FIG. 4 illustrates a detailed method for an example process that has similarities to the process described in FIG. 3. The flowchart illustrates that a cluster job process can be started with JIT debugging configuration flags. The crashing process can inform the operating system that an unhandled suspension event occurred, as in block 402. An example of the operating system that may be used can include Microsoft Windows, UNIX, Linux, or another operating system type. Then the operating system can read the datastore or an operating system database and determine a defined JIT debugger process to start in response to the unhandled exception. The operating system can start the JIT debugger, as in block 404.

A test can then be made to determine whether the JIT debugger is part of the operating system (OS) job object, as in block 406. If the JIT debugger is not part of the OS job object, then the PEB (process environment block) can be read to determine an offset to read the environmental variables block, as in block 408. When the JIT debugger is part of the OS job object then the JIT debugger can read the environmental variables from within the OS job object, as in block 410. If JIT debugger environmental variables exist, then the existence of these variables may determine that the process should be debugged, as in block 412. Otherwise, the JIT debugger may exit if no JIT debugging environmental variables have been set, as in block 418. In some configurations, debugging may start even if no environmental variables are provided and a default debugging functions may be provided.

If the JIT debugger environmental variables are set to request a crash dump capture, then the JIT debugger may take a crash dump of the process, as in block 414. The crash dump may be written to a mass storage device on the compute device but other local or networked storage location options can be used too.

The JIT debugger may open a handle to the user process and wait for the process to be debugged, as in block 416. Waiting for an attachment operation may be dependent on whether the environmental variable used to activate the wait for attachment function has been set. If the JIT debugger is not configured to wait for an attach operation than the JIT debugger can exit, as in block 418.

If the JIT debugger is waiting for an attach operation, the JIT debugger can inform the job manager that a process with a PID (process ID) that is part of a cluster job is waiting for debugging to begin, as in block 420. This means that the JIT debugger can loop until a time threshold is reached. If the time threshold is reached or the process exits then the JIT debugger can exit, as in block 422. In addition, the job monitor can inform the user of the process waiting for an attachment operation by a symbolic debugger, for example, by sending email, SMS text, instant message or other electronic communication.

As discussed, this technology can allow the user to analyze process failures and problems for a cluster job. In the past, when processes failed for a job the user had little information about the process failure and it was difficult for the user to take action with respect to debugging the process on the compute node. Using this technology, the user can be notified that a crash has occurred or a debugging set point has been reached. The process can be held in a suspended state so that a symbolic debugger can be attached to analyze the process state. In addition, a crashing process' memory state can be dumped to a file for off-line or post-mortem analysis. This technology enables the configuration of just-in-time debugging for cluster processing groups.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

The methods described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. The "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A system for debugging in a cluster processing network, comprising:
   a processor;
   a scheduler operable with the processor to dispatch a process that is part of a cluster job for execution;
   a compute node to execute the process dispatched by the scheduler to the compute node;
   a debugger activated in response to an unhandled suspension event for the process on the compute node, wherein the debugger sends a notification message regarding the unhandled suspension event, the debugger being configured to determine whether the process is part of any cluster job and to deactivate when the process is not part of any cluster job; and
   a job monitor to receive the notification message from the debugger that an unhandled suspension event has occurred.

2. The system as in claim 1, wherein the debugger informs the job monitor that the process that is part of a cluster job is waiting for debugging to begin.

3. The system as in claim 1, further comprising a user interface in the job monitor to display a notification that the process on the compute node is waiting for an attachment of a debugger.

4. The system as in claim 1, further comprising a user interface in the job monitor to display a notification of an activation of the debugger on the compute node.

5. The system as in claim 1, wherein the debugger accesses environmental variables in order to determine an action to take when the unhandled suspension event is received.

6. The system as in claim 5, wherein environmental variables determine one or more actions of the debugger when the unhandled suspension event is received and the environmental variables are selected from a group consisting of performing a debug file dump, waiting for an attach for a crashed process, and waiting for an attach for a process that has a debug break.

7. The system as in claim 5, wherein the environmental variables determine whether a debugger times out waiting for a debugger attach after a pre-defined time limit.

8. The system as in claim 5, wherein the debugger writes a crash dump for the process to a pre-defined location associated with the compute node.

9. The system as in claim 1, wherein the debugger opens a handle to the process and waits for the process to be debugged.

10. The system as in claim 1, further comprising a head node to manage a cluster job processed on the cluster processing network, wherein the head node contains the job monitor.

11. A method for debugging of a process in a cluster job in a cluster processing network, comprising:
    dispatching a process to execute on a compute node using a scheduler;
    executing the process that is part of the cluster job on the compute node;
    activating a debugger on the compute node in response to an unhandled suspension event for the process, the debugger being configured to determine whether the process is part of any cluster job and to deactivate when the process is not part of any cluster job; and
    sending a notification from the debugger to a job monitor that an unhandled suspension event has occurred.

12. The method as in claim 11, further comprising informing the job monitor that a process for the cluster job is waiting for debugging to begin.

13. The method as in claim 11, further comprising displaying a notification about an activation of the debugger using a user interface in the job monitor.

14. The method as in claim 11, further comprising accessing environmental variables with the debugger in order to determine an action to take upon receiving an unhandled exception.

15. The method as in claim 11, further comprising opening a handle to the process and waits for the process to be debugged.

16. The method as in claim 11, further comprising starting the process on the compute node with just-in-time debugging configuration flags.

17. A method for just-in-time debugging in a cluster processing network, comprising:
    starting a process on a compute node with just-in-time debugging configuration flags;
    informing an operating system on the compute node that an unhandled exception occurred for a process executing on the compute node;
    starting a just-in-time debugger based on a configuration setting read by the operating system, wherein the just-in-time debugger attaches to the process, the just-in-time debugger being configured to determine whether the process is part of any cluster job and to deactivate when the process is not part of any cluster job;
    reading the just-in-time debugging configuration flags to determine an action for the just-in-time debugger to take; and
    sending a message to a job manager that a process which is part of a cluster job is waiting for debugging to begin.

18. The method as in claim 17, further comprising taking a crash dump of the process based on the lust-in-time debugging configuration flags.

19. The method as in claim 17, further comprising opening a handle to the process and waiting for the process to be debugged based on the just-in-time debugging configuration flags.

20. The method as in claim 17, wherein informing a job manager on a head node that a process is waiting to be debugged further comprises informing a user that a process is waiting for debugging to begin via an email sent to a user.

* * * * *